Figure 1:
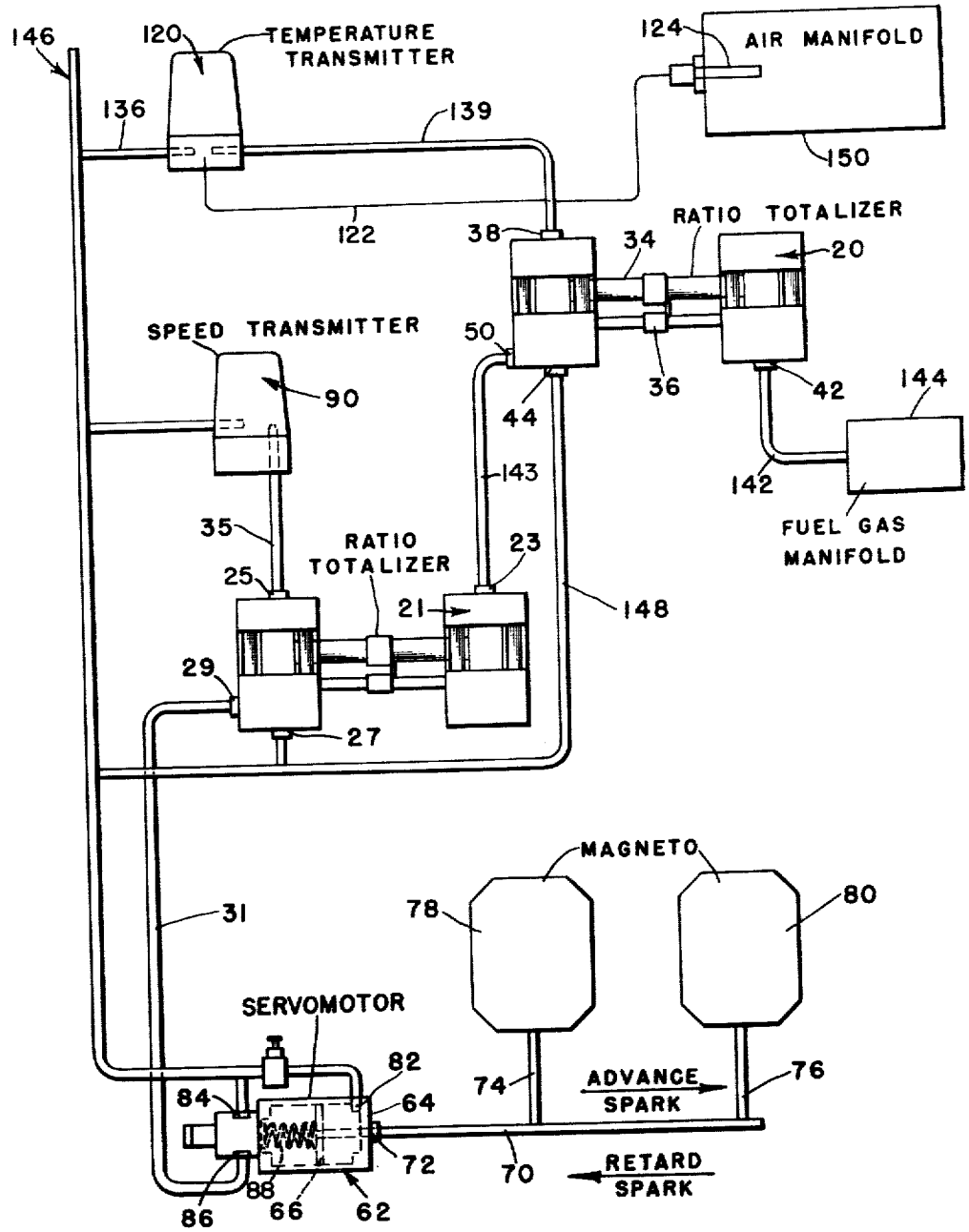

Aug. 6, 1963 W. A. PERRY 3,099,984
ENGINE CONTROL
Filed April 13, 1960 2 Sheets-Sheet 2

INVENTOR
WILLIAM A. PERRY
BY Charles J. Worch
AGENT

United States Patent Office 3,099,984
Patented Aug. 6, 1963

3,099,984
ENGINE CONTROL
William Arthur Perry, Painted Post, N.Y., assignor to Ingersoll-Rand Company, New York, N.Y., a corporation of New Jersey
Filed Apr. 13, 1960, Ser. No. 21,940
15 Claims. (Cl. 123—148)

The present invention relates to spark ignited internal combustion engines and to controls therefor. More particularly the invention relates to controls for a supercharged high compression gas engine to maintain optimum fuel consumption over the entire rated speed and load range of the engine.

In order to fully understand the invention, the following characteristics of the engine unit must be understood.

Assuming a constant load on the engine, any variation in the speed thereof results in a proportional variation in its fuel manifold pressure and in its air manifold pressure. The pressure of fuel supplied to the engine is varied by a speed governor to maintain the speed of the engine relatively constant and independent of the load. The governor is manually controlled in order to vary the speed of the engine. As an example, to effect a reduction of engine speed, the governor is manually controlled to lower fuel pressure and supply less gas to the engine. It thus follows that with lower engine speeds, the output to the air manifold of the supercharger driven by an exhaust gas turbine will also drop because of a reduction of exhaust gas weight flow.

It must also be understood that assuming now a constant engine speed, any variations in load or work torque on the engine will result in a proportional variation in the fuel manifold pressure and the air manifold pressure. The variation in the fuel manifold pressure is caused by a change in governor position in an attempt to maintain a constant speed. For example, if the required torque output (i.e. working torque) decreases, the engine will tend to speed up and accordingly the speed governor throttles the supply of fuel to the engine, thereby resulting in a decrease in the fuel manifold pressure. The air manifold pressure will be reduced because of the decrease in the fuel supply in the engine which will result in a reduction in the power available in the exhaust gas of the engine, thereby reducing the speed of the supercharger.

It must also be understood that any variations in the air manifold temperature results in variations in air manifold pressure and consequently in fuel manifold pressure as the engine attempts to maintain speed.

The invention contemplates means for maintaining the optimum fuel consumption over the entire rated speed and load range of the engine by varying the timing of the spark. It has been determined that the foregoing may be accomplished by varying the spark timing of the engine in accordance with the speed and/or torque of the engine, and that said variation must be inversely related. That is to say, as the torque or load is progressively increased, the spark is progressively retarded. On the other hand, as the speed is progressively increased, the spark is progressively advanced.

Accordingly, one object of the invention is to maintain the maximum efficiency and economy of a spark ignited internal combustion four stroke cycle, gas engine over the entire rated load range of the engine at any engine speed or engine torque.

Another object of the invention is to avoid detonation in a high compression engine of the above indicated character.

Still another object of the invention is to provide engine control means which will result in a net fuel savings in engine operation.

And another object of this invention is to provide an automatic spark control for a combustion engine, having signal transmitters and regulating means each operating on a common constant pressure fluid and all cooperating to modify such fluid in accordance with operating conditions and to transmit the modified pressure fluid to a servomotor for spark adjustment.

The invention contemplates means for effecting desired engine control whereby a fuel manifold pressure signal is introduced into one end of a ratio totalizer while an air manifold temperature pressure signal is introduced into the opposite end thereof. As is known in the art, the totalizer, such as the Hagan type or the like, is adapted to add, subtract, divide, or otherwise perform various functions in the combining of pressure signals. Hence the two foregoing pressure signals in accordance with the requirements of the invention are added so the resulting output signal pressure represents a ratio of the sum of the two input signal pressures.

The first totalizer output pressure is then introduced into one end of a second totalizer, while an engine speed pressure signal is introduced into its opposite end. These two signals are subtracted so that the output pressure represents a resultant which has been governed by the difference between the two input signal pressures. The reasons for the foregoing will appear more fully hereinafter.

The resultant pressure is then transmitted to operate a servo-motor which in turn is connected to externally adjustable magnetos and sets the timing thereof to advance or retard the spark.

As heretofore stated, as the load on the engine is progressively increased, the spark must be progressively retarded. Hence in the first totalizer the two signals introduced are added so that their forces are combined towards reducing the system operating pressure. On the other hand as the speed is progressively incrased, the spark must be progressively advanced. Therefore in the second totalizer the pressure signal representing the speed is subtracted to increase the system operating pressure. The servo-motor is so connected to the magnetos that an increased system operating pressure thereon will advance the spark while a reduced system operating pressure thereon will retard the spark.

The foregoing, and other objects and advantages of the invention will appear more fully hereinafter from a consideration of the detailed description which follows taken together with the accompanying drawings wherein one embodiment of the invention is illustrated by way of example. It is to be understood that the drawings are for the purpose of illustration only and are not to be construed as defining the limits of the invention.

Figure 2:
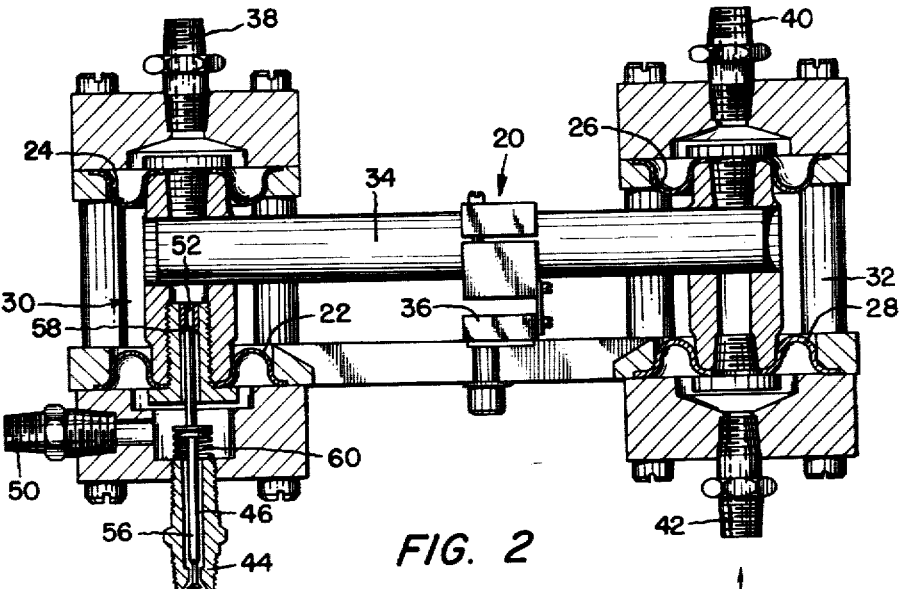
Figure 5:
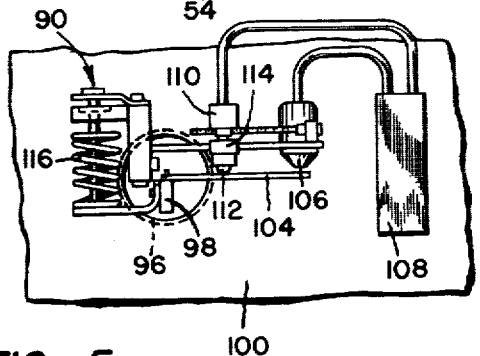
Figure 3:
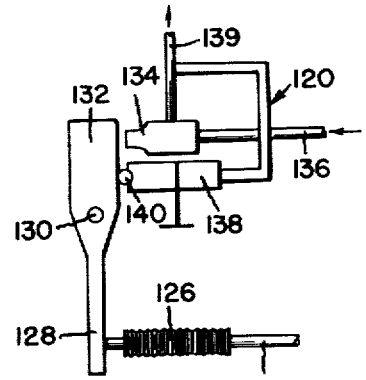
Figure 4:
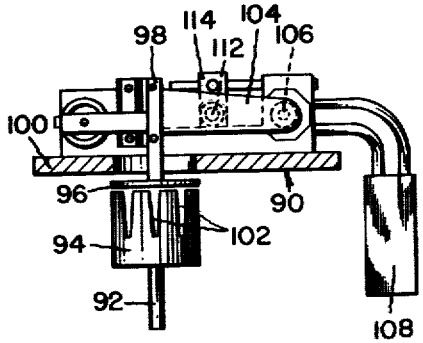

In the drawings:

FIGURE 1 is a schematic view of the engine control system in accordance with the present invention illustrating the various components thereof, and the inter-relation therebetween, FIGURE 2 is a sectional view of a ratio totalizer for the novel system of FIGURE 1, FIGURE 3 is a schematic view of a temperature transmitter for the novel system of FIGURE 1, and FIGURES 4 and 5 are schematic views in elevation and plan, respectively, of a speed transmitter for the novel system.

*Ratio Totalizer Operation*

A ratio totalizer is a control mechanism commonly used in the art, such as a Hagan totalizer, operates on a force balance principle. The totalizer is pneumatically operated and combines various input signal pressures to produce a single resultant output pressure.

Referring to FIG. 2, the totalizer 20 comprises four flexible diaphragm pressure elements 22, 24, 26 and 28, arranged in opposing pairs. The pressure elements 22 and 24 are attached to a common post 30, while the elements 26 and 28 are attached to a common post 32. A beam 34, generally called a balance beam, rotates in seesaw fashion about a fulcrum 36, and is connected at one end to post 30 and to post 32 at its other end. Leading to the pressure diaphragms, are three input signal ports, port 38 leading to the diaphragm 24, port 40 leading to the diaphragm 26, and port 42 leading to the diaphragm 28. These ports are each adapted to introduce a pressure signal to its respective diaphragm which transmits the force thereof to the balance beam 34.

A remaining inlet 44 is adapted to receive a compressed air supply for operating an instrumentation system, and houses a poppet type pilot valve 46. When pressure is introduced into the inlet port 44, it may pass through an output port 50 or an exhaust port 52. To control this flow, the valve 46 has a valve stem 56 with a valve seat 54 at one end adapted to close the inlet port 44 while the opposite end of a valve stem 56 is adapted to close an orifice 58 to effect closure of exhaust port 52, depending on the position of the valve stem.

Movement of the balance beam 34 about the fulcrum 36 is transmitted by direct contact with the end of the valve stem 56 which operates between the inlet and exhaust ports 44 and 52 of the valve assembly. A spring 60 continuously biases the valve stem 56 towards its position for closing the exhaust port 52.

It will now be seen that when pressure is introduced to the diaphragm elements 24, 26, and 28 and 22, the balance beam 34 will be rotated about the fulcrum 36. Counterclockwise movement of the beam 34 will therefore move the valve 46 to open the inlet port 44 and thereby raise the output signal pressure provided by output port 50. Clockwise movements of the beam 34 will move the valve 46 to close the inlet port 44 and open the exhaust port 52, thereby reducing the output pressure signal of totalizer 20. When the resisting force due to the output signal pressure balances the total of forces applied to three input chambers formed by diaphragms 24, 25 and 26 from ports 38, 40, and 42, respectively, a steady value of output signal pressure is established as long as the balance of such forces remains undisturbed.

It will now also be noted that when pressure signals are introduced into the ports 38 and 42, in addition to the normal or reference air pressure supplied for the instrument system through the port 44, addition of the pressure signals will occur. When, on the other hand, pressure signals are introduced through the ports 38 and 40, as well as the normal air supply through the port 44, subtraction of the signal pressures will occur. This is important to note in the present invention, since one of the totalizers is connected with a view towards addition of the signal pressures introduced therein, while the other is connected with view towards subtraction, as will appear more fully hereinafter in relation to the novel system of FIG. 1.

*Servo-Motor Operation*

Referring now to FIG. 1, there is shown a commonly employed servo-motor 62, such as sold by the Conoflow Corporation, that comprises generally a casing 64 having a piston 66 snugly and slidably fitted therein. Attached to the piston 66, is an operating rod or stem 70 which extends outwardly of the casing 64 through a pressure sealed boss 72. The stem 70 is attached to breaker bridges 74 and 76 of a pair of externally adjustable magnetos 78 and 80, commonly manufactured and sold in the art. Spark adjustment within the magnetos 78 and 80 is accomplished by moving the breaker bridges 74 and 76 which in turn retards or advances the breaker points to cause an advanced or retarded spark.

Integral with the casing 64 are a pair of inlet ports 82 and 84 disposed on opposite sides of the piston 66 adapted to introduce the instrument operating or reference pressure into the servomotor 62. A third inlet port 86 introduces the resultant outlet pressure from the totalizer 21 to one side of a bellows which controls the position of a valve which, in turn, varies the pressure acting on one side only of the piston 66.

Generally described, in the operation of the servomotor 62 the instrument operating pressure acts on both sides of the piston 66 to cause a balanced condition. The spark timing is set according to the force of a spring 88 which exerts a constant biasing force on the piston 66. The pressure from the ratio totalizer 21, which is a resultant of all of the signal pressures introduced into both of the totalizers 20 and 21, is introduced through a line 31 and, the port 86 to act on one side only of the piston 66.

The unbalance created by this force, therefore, is the agency which causes movement of the operating stem 70 and, consequently, adjustment of the magneto spark.

*Speed Transmitter Operation*

Referring now to FIGS. 4 and 5 there is shown in elevation and plan view respectively a commonly employed pneumatic speed transmitter 90, as manufactured and sold by the Foxboro Company. An imput shaft 92 carries thereon, a permanent multiple magnet 94. A disc 96 is held in position by a flexure mounting 98 between a keeper plate 100 and the poles 102 of the magnet 94. The imput shaft 92 is connected to the engine (not shown) to directly reflect engine speed. As the shaft 92 rotates, the magnet 94 exerts a magnetomotive force on and tends to rotate disc 96 in the same direction as magnet rotation. A force bar 104 is attached to the flexure mounting 98 that supports disc 96, and the magnetomotive force, exerted on the disc 96 by the rotating magnet 94 positions the force bar 104 through flexure mounting 98 relative to a nozzle 106 wherein the instrument operating pressure has been introduced to cause a back pressure. Varying the position of the force bar 104 in relation to the nozzle 106 varies the back pressure of the air flow through the nozzle 106. This back pressure is amplified by a relay 108 to produce an output pressure which is the signal pressure from the unit 90. The output pressure is also connected to a feed back unit 110 having a ball 112 which rides against the force bar 104 thereby producing a movement which tends to balance the torque on the disc 96 produced by the magnetomotive force. The feed back unit 110 is essentially a small open ended cylinder 114 in which the ball 112 acts as a free floating piston.

Since the magnetomotive force on the disc 96 is proportional to the speed of rotation of the magnet 94, and therefore to the engine r.p.m., the output pressure signal from speed transmiter unit 90 is also proportional to such engine speed. An adjustment spring 116 exerts a force against the flexure mounting 98 to produce a desired output pressure signal at zero rotation of the shaft 92. Hence, it will be seen that by operation of the device 90, the transmitted pressure signal is directly proportional to the r.p.m. of the engine.

*Temperature Transmitter Operation*

The temperature transmitter unit 120 of the system of FIG. 1 is shown schematically in FIG. 3 and is a device commonly known in the art, as manufactured and sold by the Foxboro Company, which is adapted to convert a temperature range into an air pressure range signal for convenient transmission to measuring devices or controlling instruments; in this instance the aforementioned ratio totalizer 20. The operation of the temperature transmitter 120 is not dissimilar to that of the speed transmitter 90, and is now briefly described as follows.

A capillary unit 122 connects a temperature sensing bulb 124 (FIG. 1) to a sensitive bellows element 126 which bears against the lower end of a force bar 128. The force bar 128 is rotatable about a flexure fulcrum 130, whereupon the upper end 132 of the bar, moves relative to a nozzle 134. The reference air pressure source 146 for operating the various instruments of the system is connected to the nozzle 134 by an inlet line 136.

Varying the position of the force bar 128 in proximity to the nozzle 134 varies the back pressure therein which is thence amplified through a conventional relay, (not shown) and applied to a feed back bellows 138. The amplified back pressure, being the signal output pressure of the temperature transmitter 120, is discharged through an outlet line 139 and is directly proportional to the temperature, as varied, as sensed and transmitted from the temperature sensing bulb 124 to bellows 126. The resulting pressure change in the feed back bellows 138, by means of a cylinder and ball 140 arrangement hereinbefore described with respect to the speed transmitter unit 90, produces a restoring force on the force bar 128, which opposes that of the element 126. The temperature transmitter 120 is thus rebalanced at a new output pressure which has changed an amount proportional to the change in measured temperature.

Control System Operation

Referring now to FIG. 1, the novel engine control system herein disclosed comprises a pressure conduit 142 connecting the engine fuel manifold 144 to port 42 to introduce the fuel manifold pressure into the ratio totalizer 20. A constant pressure source 146 for operating the various units of the system is tapped by a conduit 148 connected to the inlet air supply port 44 of the totalizer 20. The opposing port 38 is connected to the outlet line 139 of the temperature transmitter 120. It will now be noted that the inlet 136 of the temperature transmitter 120 receives pressure from the same constant pressure source 146, and that the temperature sensing bulb 124 is installed in the engine air manifold 150. Therefore, the pressure signal introduced into the port 38 of the totalizer 20 represents measured temperature and varies with variations in air manifold temperature. A material increase in air manifold temperature, for example, to above 115° F. requires the spark to be retarded. It must now be stated that the ultimately adjusted resultant pressure entering the servo-motor 62 from the line 31 leading into the port 86 governs servo-motor operation to adjust the spark and if this pressure is increased, spark will be advanced. Conversely, if such resultant pressure is diminished, spark will be retarded. Such is illustrated by the direction of the arrows with reference to the movement of the operating stem 70 (FIG. 1).

Therefore it will now be seen that the totalizer 20 is converted to the source of constant pressure 146 by the instrument air operating line 146, the fuel manifold 144 by line 142, and the temperature transmitter 120 by line 139. These connections are arranged so fuel manifold pressure signal and a temperature signal are additive because both signals are applied towards turning the balance beam 34 in a counter clockwise direction thereby opening the valve 46 to increase the output pressure signal at port 50 of totalizer 20 when either or both the temperature and fuel manifold pressure increases.

The output signal so modified emerging from the port 50 of totalizer 20 is transmitted by a line 143 to a port 23 of the second ratio totalizer 21 that corresponds in structure to totalizer 20. The speed transmitter 90 is also connected to the constant pressure source 146 so that, as heretofore explained as the pressure passes therethrough it is modified in direct proportion to the speed of the engine to provide an output pressure signal that is fed by a line 35 into a port 25 of the totalizer 21. Constant pressure from the source 146 is connected to the inlet port 27 and the resultant pressure signal from outlet port 29 is connected by line 31 directly to the servo-motor 62. It will now be understood that the second totalizer 21 is connected in a manner which will bring about a subtraction of the speed transmitter output signal from the output signal of the totalizer 20 so that an increased speed transmitter signal tends to open the valve of the totalizer 21, thereby, increasing the output pressure from port 29 to the servo-motor 62 to advance the spark, as desired when engine speed increases. Conversely, if engine decreases, the pressure from the speed transmitter 90 drops causing a lower output pressure from port 29 of totalizer 21 to servo-motor 62 to retard the spark. The pressure signal from totalizer 20 acts in opposition to the signal from speed transmitter 90 so an increased signal from port 50 results in a reduced signal to servomotor 62 to retard spark, and a decreased signal from totalizer 20 will advance spark.

For purposes of discussion the operation of the control will now be considered assuming first an engine torque change with constant speed. An engine torque decrease will result in pressure in fuel manifold 144 which when introduced in totalizer 20, causes balance beam 34 to rotate clockwise about fulcrum 36 resulting in a decrease transmitted by line 143 to port 23 of totalizer 21 causing its balance beam to pivot counter clockwise thereby increasing the pressure in line 31 to servomotor 62 to advance spark. It should be realized that the direction of pressure change and of movement would be opposite to that of the foregoing with increased torque to retard spark.

Assuming now a constant torque and a change in speed, a speed decrease, reflected in speed transmitter 90, results in a lower pressure speed signal transmitted by line 35 to port 25 causing the balance beam of the totalizer 21 to rotate clockwise thereby decreasing the pressure in line 31 to servo-motor 62 to retard spark. It should be realized that the direction of pressure change and of movement would be opposite to that of the foregoing with increased speed to advance spark.

As a practical matter, however, a reduction in speed at constant torque can be effected only by throttling the fuel pressure transmitted to totalizer 20 by line 142 and, accordingly, in line 143. Reduced pressure in line 143 normally results in counter clockwise movement of the balance beam of totalizer 21 thereby resulting in an advance of spark. By proper positioning of the fulcrum along the beam of totalizer 21, opposing signals are correlated to derive desired retarded spark necessary under the condition assumed to obtain maximum efficiency of the engine.

It has thus been found that with the foregoing engine control system in operation, detonation is eliminated since the spark timing is at its optimum for all conditions and that a net savings in the fuel consumption of the engine is observable.

It has also been found with the herein described control system that at engine overloads reduced firing pressures occur. As heretofore stated when the torque is progressively increased, the spark is progressively retarded. Hence as the torque on the engine increases to full load and on to overload condition, the spark is increasingly retarded so that at overload it is considerably retarded. This in turn results in reduced firing pressure.

Thus it will be seen that there is provided an automatic control for advancing or retarding the spark of the engine correlated with the changes in speed and torque of the engine over its entire rated load at any engine speed or engine torque.

Although only one embodiment of the invention has been illustrated and described, it will be apparent to those skilled in the art that changes and modifications may be made in the form and general arrangement of the

I claim:

1. A control for a spark ignited engine having a fuel manifold, comprising a pressure actuated servomotor to set the spark for the engine, a source of constant pressure for said servomotor, a speed transmitter for providing a signal representing the speed of the engine, and regulator means connecting said source to said servomotor and being connected to said fuel manifold and transmitter for providing modified constant pressure to actuate said servomotor and set the spark for the engine in accordance with fuel manifold pressure and engine speed.

2. The control in accordance with claim 1 in which said regulator means comprises a first regulator connected to the fuel manifold and responsive to the pressure therein, a second regulator connected to said transmitter and being responsive to the signal therefrom, one of said regulators being connected to the other of said regulators to provide a signal thereto, and the other of said regulators connecting said source to said servomotor.

3. A control for a spark ignited engine, having an air manifold and a fuel manifold, comprising a pressure actuated servomotor to set the spark for the engine, a source of constant fluid pressure for said servomotor, a temperature transmitter for providing a fluid pressure signal representing the air manifold temperature of the engine, a speed transmitter for providing a fluid pressure signal representing the speed of said engine, and regulator means connecting said source to said servomotor and being connected to said transmitters and fuel manifold for providing modified constant fluid pressure in response to the combined fluid pressure signals to actuate said servomotor and set the spark for the engine in accordance with air manifold temperature, fuel manifold pressure, and engine speed.

4. The control in accordance with claim 3 in which said regulator means comprises a first regulator connected to said temperature transmitter and fuel manifold, a second regulator connected to said speed transmitter, one of said regulators being connected to the other of said regulators, and the other of said regulators connecting said source to said servomotor.

5. A spark control for an engine having an air manifold, comprising at least one magneto having an adjustable spark, a pressure actuated servomotor connected to said magneto to set the spark, a source of constant fluid pressure, a temperature transmitter connected to said source and to said air manifold to provide a fluid pressure signal representing air manifold temperature, a speed transmitter connected to said source and to the engine to provide a fluid pressure signal representing engine speed, regulator means connecting said source to said servomotor and being connected to said transmitters for providing modified constant fluid pressure in response to the combined fluid pressure signals from said transmitters to actuate said servomotor and set the spark in response to the temperature and speed signals.

6. The spark control in accordance with claim 5, and said regulator means having a ratio adjustment for varying the relative value of one fluid pressure signal to the other.

7. The spark control in accordance with claim 1, and said regulator means having a ratio adjustment for varying the relative value of said signal to the fuel manifold pressure.

8. An automatic spark control system for an engine having an air manifold, comprising a source of constant fluid pressure for the components of the system, a temperature transmitter connected to said source being connected to the air manifold of the engine for modifying the constant fluid pressure in accordance with air manifold temperature to provide a fluid pressure signal, a speed transmitter connected to said source being connected to the engine for modifying the constant fluid pressure in accordance with engine speed to provide a fluid pressure signal, at least one magneto having an adjustable spark, a pressure actuated servomotor connected to said magneto to set the spark, and pressure signal responsive regulator means connecting said source to said servomotor being connected to said transmitters for providing modified constant fluid pressure in response to the combined fluid pressure signals from said transmitters to actuate said servomotor and set the spark in accordance with air manifold temperature and engine speed.

9. The automatic spark control system in accordance with claim 8, and said regulator means having a ratio adjustment for varying the relative values of the pressure fluid signals to each other.

10. An automatic spark control system for an engine having an air manifold and a fuel manifold with pressure therein, comprising a source of constant fluid pressure for the components of the system, a temperature transmitter connected to said source being connected to the air manifold of the engine for modifying the constant fluid pressure in accordance with air manifold temperature to provide a fluid pressure signal, a speed transmitter connected to said source being connected to the engine for modifying the constant fluid pressure in accordance with engine speed to provide a fluid pressure signal, at least one magneto having an adjustable spark, a pressure actuated servomotor connected to said magneto to set the spark, and pressure signal responsive regulator means connecting said source to said servomotor being connected to said transmitters and to said fuel manifold to provide modified constant fluid pressure in response to the combined fluid pressure signals to actuate said servomotor and set the spark in accordance with air manifold temperature, fuel manifold pressure and engine speed.

11. The automatic spark control system in accordance with claim 10, and said regulator means combining the temperature fluid pressure signal and the fuel manifold pressure to derive a resultant fluid pressure signal and having a ratio adjustment for varying the relative values of the speed fluid pressure signal and the resultant fluid pressure signal to each other.

12. The automatic spark control system in accordance with claim 10, and said regulator means having a ratio adjustment for varying the relative values of the temperature fluid pressure signal and the fuel manifold pressure to each other.

13. An automatic spark control system for an engine having an air manifold and a fuel manifold with pressure therein, comprising a source of constant fluid pressure for the components of the system, a temperature transmitter connected to said source being connected to the air manifold of the engine for modifying the constant fluid pressure in accordance with air manifold temperature to provide a fluid pressure signal, a first regulator connected to said source being connected to said transmitter and to said fuel manifold for providing modified constant fluid pressure as an output signal in accordance with the temperature fluid pressure signal and fuel manifold pressure, a speed transmitter connected to said source being connected to the engine for modifying the constant fluid pressure in accordance with engine speed to provide a fluid pressure signal, at least one magneto having an adjustable spark, a pressure actuated servomotor connected to said magneto to set the spark, and a second regulator connecting said source to said servomotor being connected to said speed transmitter and to said first regulator for providing modified constant fluid pressure in response to the combined fuel manifold pressure and fluid pressure signals from said transmitters to actuate said servomotor and set the spark in accordance with air manifold temperature, fuel manifold pressure, and engine speed.

14. The automatic control system in accordance with claim 13, and said first regulator having a ratio adjustment for varying the relative values of the temperature fluid pressure signal and the fuel manifold pressure to each other.

15. The automatic control system in accordance with claim 13, and said second regulator having a ratio adjustment for varying the relative values of the first regulator output signal and the speed fluid pressure signal to each other.

References Cited in the file of this patent

UNITED STATES PATENTS

| | | |
|---|---|---|
| 2,217,364 | Halford et al. | Oct. 8, 1940 |
| 2,378,037 | Reggio | June 12, 1945 |
| 2,670,724 | Reggio | Mar. 2, 1954 |

UNITED STATES PATENT OFFICE
CERTIFICATE OF CORRECTION

Patent No. 3,099,984                                                    August 6, 1963

William Arthur Perry

It is hereby certified that error appears in the above numbered patent requiring correction and that the said Letters Patent should read as corrected below.

Column 2, line 39, for "incraseed" read -- increased --; column 4, line 28, after "view" and "respectively" insert a comma; line 59, for "transmiter" read -- transmitter --; lines 74 and 75, for "aforementioed" read -- aforementioned --; column 5, line 2, strike out "as follows"; line 34, after "pressure" insert -- status --; line 58, for "converted" read -- connected --; same column 5, line 73, after "explained" insert a comma; column 6, line 25, before "decreased" insert -- pressure --.

Signed and sealed this 3rd day of March 1964.

(SEAL)
Attest:

ERNEST W. SWIDER                                           EDWIN L. REYNOLDS

Attesting Officer                                         Acting Commissioner of Patents